(12) United States Patent
Kenesi et al.

(10) Patent No.: US 8,000,237 B1
(45) Date of Patent: Aug. 16, 2011

(54) METHOD AND APPARATUS TO PROVIDE MINIMUM RESOURCE SHARING WITHOUT BUFFERING REQUESTS

(75) Inventors: Zsolt Kenesi, Budapest (HU); Gabor Nemeth, Budapest (HU); Benedek Kovacs, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 14 days.

(21) Appl. No.: 12/695,734

(22) Filed: Jan. 28, 2010

(51) Int. Cl.
*H04L 12/26* (2006.01)

(52) U.S. Cl. .......... 370/230; 370/252

(58) Field of Classification Search .......... 370/229, 370/230, 232, 235, 235.1, 252, 253, 395.42, 370/468
See application file for complete search history.

(56) References Cited

U.S. PATENT DOCUMENTS

| | | | |
|---|---|---|---|
| 5,115,430 A * | 5/1992 | Hahne et al. .......... | 370/440 |
| 2008/0008090 A1 | 1/2008 | Gilfix | |
| 2008/0130495 A1 * | 6/2008 | Dos Remedios et al. .... | 370/230 |
| 2009/0199190 A1 * | 8/2009 | Chen et al. .......... | 718/102 |
| 2010/0100616 A1 * | 4/2010 | Bryson et al. .......... | 709/223 |
| 2010/0153958 A1 * | 6/2010 | Richards et al. ...... | 718/104 |

OTHER PUBLICATIONS

Kovacs: "Rate based call gapping with priorities and fairness between traffic classes", Sep. 24, 2008.
ITU-T Recommendation H.248.11: "Gateway control protocol: Media gateway overload control package",Nov. 2002.
Telecommunications and Internet Converged Services and Protocols for Advanced Networking (TISPAN); NGN Congestion & Overload Control; Part 2: Core GOCAP and NOCA Entity Behavoiurs. ETSI Draft, 03034-2-NGN-R3V302; European Tetecommunications Standards Institute ETSI, Sophia Antipolis, France. ETSI ES 283 039-2 v3.0.2. Sep. 8, 2009.

* cited by examiner

*Primary Examiner* — Brian D Nguyen

(57) ABSTRACT

A throttle device is coupled with a central processing unit in a node for reducing traffic overload in a Next Generation Network (NGN). The device is coupled with a basic throttle with different levels of traffic priority and both are situated between a source node and a target node for processing traffic. When a traffic offer is received by the throttle, the throttle device by provisionally updating the basic throttle priority levels, determines whether to send the traffic offer on to the source node. If the provisional, traffic priority level is greater than a new traffic priority level the traffic is admitted and rejected if the updated priority level is less than the new traffic priority level.

18 Claims, 4 Drawing Sheets

Fig. 1

(Prior Art)

METHOD AND APPARATUS TO PROVIDE MINIMUM RESOURCE SHARING WITHOUT BUFFERING REQUESTS

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to telecom network media overload. More particularly, and not by way of limitation, the present invention is directed to a system and method for controlling signaling overload.

Prior Art and Problems

In Next Generation Networks (NGNs), many protocols, e.g., H.248.11 (also known as Gateway Control Protocol) are used for controlling media setup of a call. The protocol messages are processed on a central processing unit (CPU) of corresponding nodes.

Different types of nodes have different signal processing capacity and some nodes might have significantly higher capacity than others. Because of that there are scenarios, where signaling overload caused by the source node in a specified target node has a high probability of occurring.

Signaling overload causes system performance degradation even if the node is able to protect itself by rejecting offers. External overload control mechanisms have been developed to restrict in advance (in a source node) the traffic that is offered to a target node. There are call-gapping algorithms that decide whether the offer should be sent out to the target. If the desired maximal offer characteristics are known (determined as part of the external overload control) decision logic in the source node is referred as a throttle.

An external overload control mechanism itself can control different types of descriptors of traffic flows in a system. For example, Windows-based solutions control the message turn-around time with a throttle limiting the number of offers in the system while other solutions work with restricting a percentage of the offers compared to the previous period of time. Many others like H.248.11, control the rate of the offers and use token bucket as a throttle.

Figure 1:
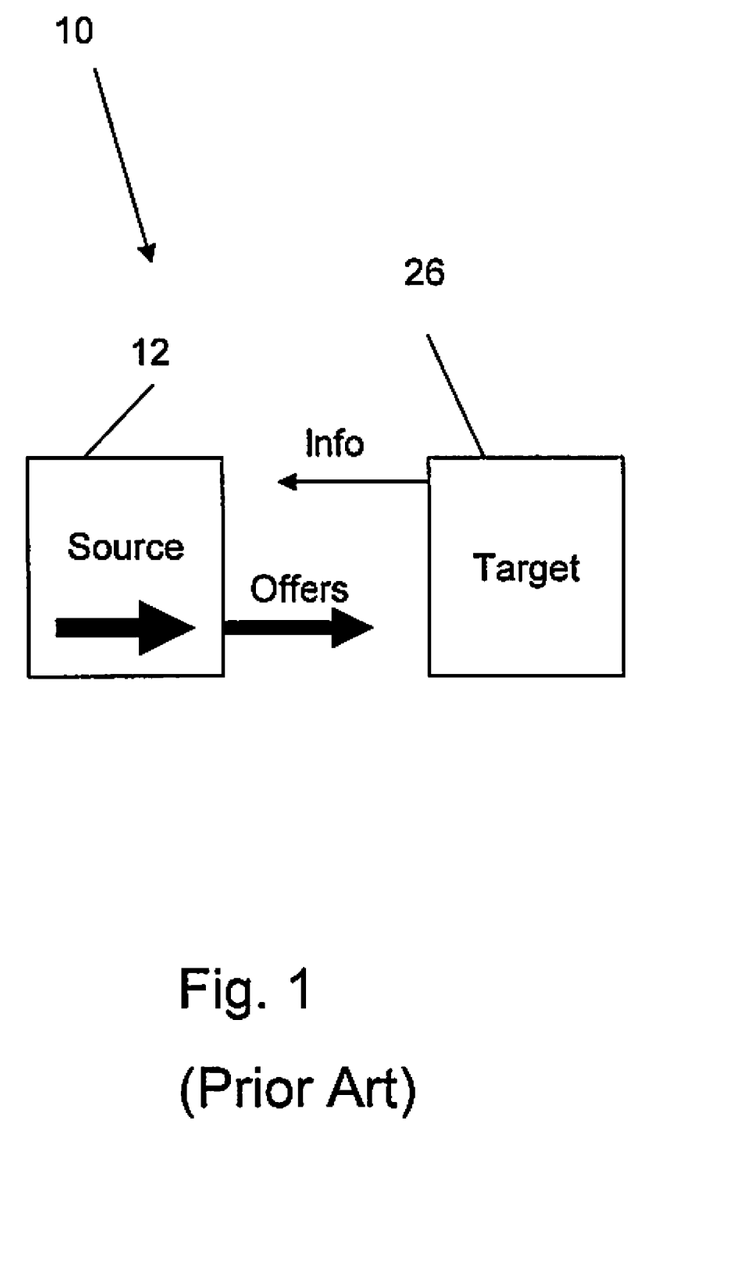
FIG. 1 depicts an external overload control architecture.

FIG. 1 depicts external overload control architecture. Typical requirements on an offer rate limiting throttle in H.248.11 are: [a] the rate of the offers sent out should be limited according to the rate determined by other parts of the external overload control; [b] an offer should always be sent out once the limit is not violated; [c] when only one offer can be sent out and there are two candidates, always send out the one with the higher priority; and [d] once different traffic classes are defined (on the same priority level), and there are candidates not to be sent out because of the limitations then the offer rate representing the resource should be split according to some defined agreements between the traffic classes (Service Level Agreements). (req-3)

The problem with these requirements is that once they are put into a real system environment it is very hard to decide whether they are being met or not. Furthermore, the requirements might have a different interpretation and even concurring exact definitions when all of them can not be satisfied at the same time.

The rate of offers is not violated on average and according to the watermark level the maximal peak in traffic; thus, the maximal violation of the rate is also limited. Setting of a watermark parameter determines how likely the bucket produces higher throughput rates for short times (violates [a]) or does not send out candidates although there would not be rate violation (violates [b]).

The rate does handle priorities by applying different watermarks for different priority levels. Thus, throughput characteristics are different for priorities; i.e., calls with higher priority cause higher peaks in traffic (requirement [2] ok).

Does not handle traffic classification so can not handle throughput share type of Service Level Agreement (violates requirement [d])

There are methods like Weighted Fair Queuing that queues offers and thus causes delay in the transmission which solves [d]. It is often required to give a solution without using queues but providing maximal throughput.

"Rate Based Call Gapping" is a method based on offer rate and admission rate measuring that provides a solution for all three requirements without applying queues but its priority handling is not straightforward.

This means that if the parameters are set so that they affect the priority handling then the behavior still depends on incoming traffic and there is always a positive probability of a lower priority call being admitted because of throughput share SLA priority and a higher priority call may be admitted although the admittance violates SLA agreements.

It would be advantageous to have a system and method for resource sharing without buffering requests that overcomes the disadvantages of the prior art. The present invention provides such a system and method.

BRIEF SUMMARY OF THE INVENTION

The present invention discloses a throttle device for reducing traffic overload in a Next Generation Network (NGN). In one aspect, the present invention is directed to a method of reducing traffic overload in a Next Generation Network (NGN), wherein traffic includes the flow of admitted requests, calls, packets and tasks. The method utilizes a throttle device, coupled with a basic throttle that has different levels of traffic priority, and is situated between a source node and a target node for processing traffic offers received from the source node. The throttle device is configured to determine whether to send the traffic offer on to a node targeted by the source node. The throttle device is an extension of the basic throttle device and provisionally updates the basic throttle as if the traffic offer is admitted. A new traffic priority level is then determined. The traffic offer is admitted if the provisionally updated basic throttle priority level is greater than or equal to the new traffic priority level. The traffic offer is rejected if the provisionally updated traffic priority level is less than the new traffic priority level.

In another aspect, the present invention is directed to a throttle device for reducing traffic overload in a Next Generation Network (NGN). The throttle device is coupled with a basic throttle that has different levels of traffic priority, being situated between a source node and a target node for processing a traffic offer received from the source node. The throttle device is configured for determining whether to send the traffic offer on to a node targeted by the source node. The throttle device provisionally updates the basic throttle as if the traffic offer has been admitted, wherein a new traffic priority level of the basic throttle is determined. The basic throttle admits the traffic offer if the provisionally updated basic throttle priority level is greater than or equal to the new traffic priority level and rejects the traffic offer if the provisionally updated traffic priority level is less than the new traffic priority level.

In yet another aspect, the present invention is directed to a system in a Next Generation Network (NGN) for reducing traffic overload. A throttle device is coupled with a basic throttle that has different levels of traffic priority and is situated between a source node and a target node for processing a traffic offer received from the source node. The throttle device is configured for determining whether to send the traffic offer on to a node targeted by the source node. The throttle device provisionally updates the basic throttle as if the traffic offer is admitted. A new traffic priority level of the basic throttle is then determined and the basic throttle admits the traffic offer if the provisionally updated basic throttle priority level is greater than or equal to the new traffic priority level. The basic throttle rejects the traffic offer if the provisionally updated traffic priority level is less than the new traffic priority level.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following description of the invention.

Figure 2:
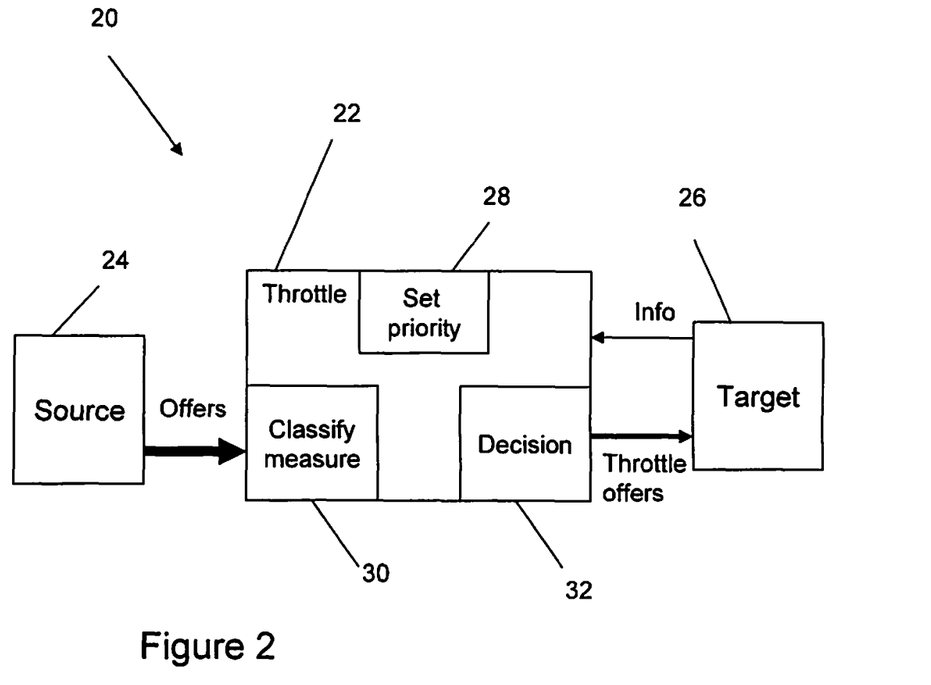
FIG. 2 illustrates a high-level block diagram of an overload control apparatus in accordance with an embodiment of the present invention.

FIG. 2 illustrates a high-level block diagram of an overload control apparatus in accordance with an embodiment of the present invention. The throttle itself is treated as a target (as a substitute for the actual target) that actually makes decisions regarding offers upon admittance of an offer. In other words, throttle 28 is seen by Source 14 as Target 14. Throttle 28 has its exact capacity determined and expressed in a rate that is an input of a decision algorithm.

To provide minimum share, a basic throttle is required to handle priorities. Previously, throttles typically had two logical steps:

1. Determine the priority and class of the offer and update the estimators
2. Make a decision upon the gathered information. (e.g., Token Bucket compares the bucket size to the watermark, Rate based Call Gapping compares the provisional admission rate to a goal function.)

The throttle mechanism of the present invention comprises three logical steps:

1. Determine the priority and class of the offer and update the estimators
2. Modify (decrease) the priority level of the excess offers
3. Make a decision upon the gathered information. (e.g., Token Bucket compares the bucket size to the watermark, Rate based Call Gapping compares the provisional admission rate to a goal function.)

A Token Bucket throttle does not measure incoming traffic rate. The throttle device of the present invention actually extends the Token Bucket throttle with offer rate measurement and priority level manipulation and measures offer rates. The throttle device is typically situated in corresponding nodes of a network where offers are received and processed in a central processing unit of the nodes.

Source 12 generates offers for Target 14 and throttle 22 is positioned between Source 12 and Target 14, typically being included in Target 14 node. Throttle 22 includes classification and measurement module 24, decision module 26 and priority adjustment module 28.

An offer is placed so that throttle 22 at time $t_n$ has to make a decision; to accept or reject the offer. (A previous offer event occurred at time $t_{n-1}$). Next throttle 22 is aware of priority levels and traffic classes and can determine to which class the offer belongs, e.g., the offer belongs to traffic class 'i' with priority level 'j'.

An incoming offer rate $r_i(t_n)$ vector is calculated for all traffic classes using an estimator proposed in PCT/EP2008059693 (publication in January, 2010). If the incoming offer rate for the given traffic class is higher than the agreed share, $r_i(t_n) > s_i c(t)$, the priority of the given offer has to be decreased from 'j' to 'new'. Otherwise no modification is needed and new is to be set to j.

The provisional bucket size is calculated with any Token Bucket update equation, e.g., $$\beta(t\_n) := \b(t\_{n-1}) - \int\_{t\_{n-1}}^{t\_n} c(t)\, dt + \nu,$$

where $\nu$ is the number of Tokens needed to be consumed for the particular offer arrived at t_n. Then the decision is made by the original Token Bucket algorithm on the modified offer with a new watermark $W_{new}$, i.e., the call is admitted if $\beta(t_n) < W_{new}$. The call is admitted if $\beta(t_n) < W_{new}$. If the offer is rejected, the bucket size is left unchanged $b_i(t_n) = b_i(t_{n-1})$ and if the offer is admitted, the bucket size is updated to $b_i(t_n) = \beta_i(t_n)$.

Figure 3:
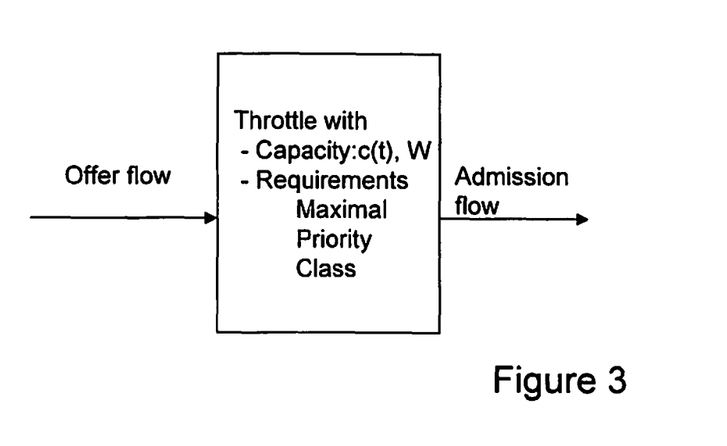
FIG. 3 depicts a high-level view of the throttle extension and its environment according to an embodiment of the present invention.

FIG. 3 depicts a high-level view of the throttle and its environment according to an embodiment of the present invention. All unnecessary elements of the overload control model shown in FIG. 2 are left out and the throttle itself is shown as an individual functional entity. All requests, calls, packets or tasks named as offers are provided by a source node to the throttle at first and the throttle decides whether or not to send them to a target node. As far as the source node is concerned, the throttle is the target node.

Definitions of the throttle/apparatus elements and technical assumptions for the mathematical model:

1. The throttle is maps from offer load point process to the set of actions: {admission, rejection}. This function is characterized with its rate (c(t)) and peak (W) capacity similar to a Token Bucket and a decision strategy. Running the decision strategy does not require capacity of the type that the throttle is characterized with.

2. An offer is the event when the throttle has to decide on admission or rejection. If an offer is admitted, it cannot be rejected and if the offer is rejected, it cannot be admitted. The offer has measurable properties of priority and class.
3. The offer load or offered traffic is the flow of offers characterized by a progressively measurable, but not necessarily stationary, point process marked with the marks from the mark space that is the direct product of the set of priorities and classes (the implication is that the probability of two offer events occurring at the same time is zero).
4. The class and priority sets have finite elements.
5. The throughput, or admitted traffic, is the flow of admitted offers (throttle admits an offer). The flow of admitted offers can be conditioned upon the whole history of the offer load flow and upon the throttle parameters.

These assumptions and definitions are only needed to make the mathematical discussion clear.

Figure 4:
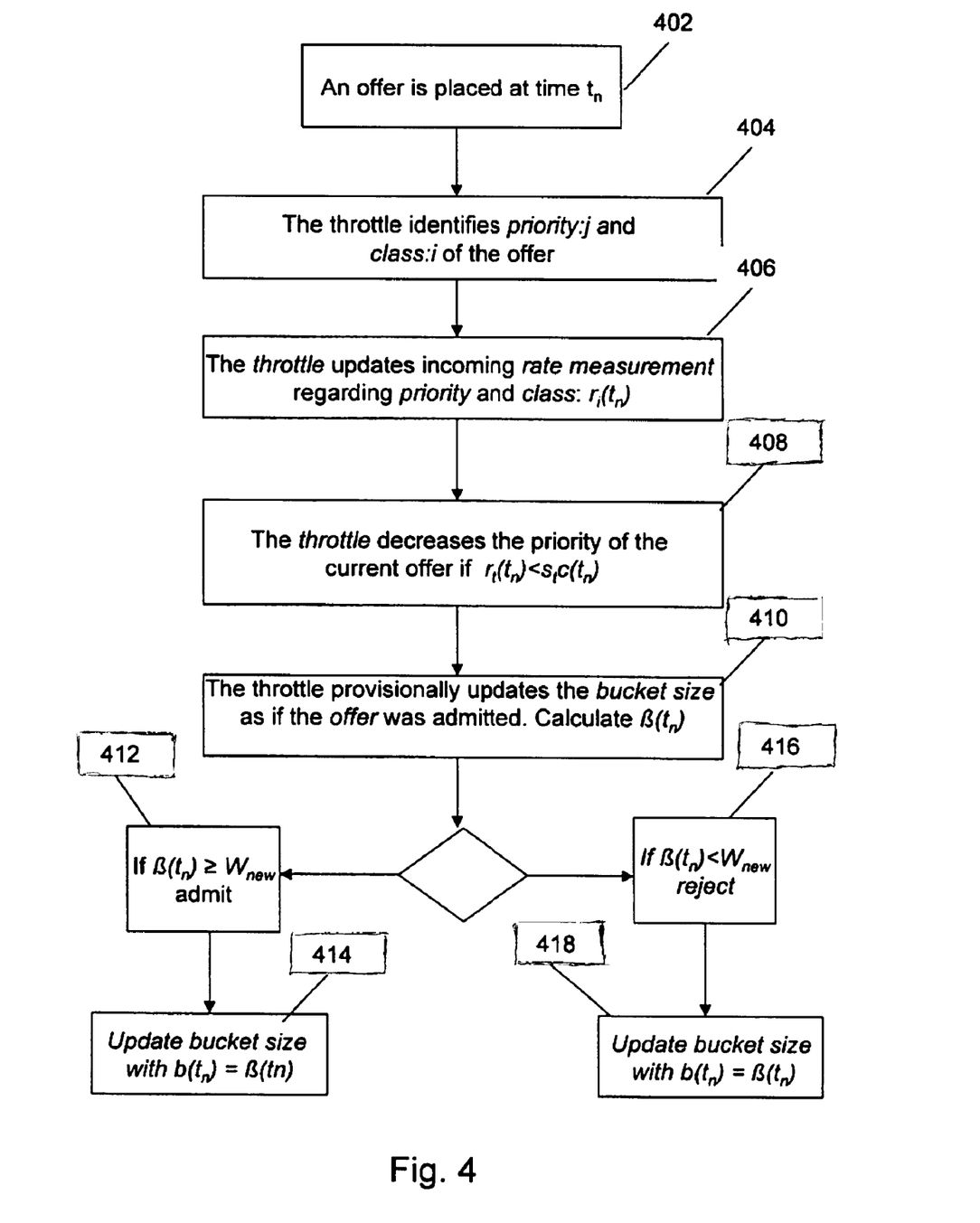
FIG. 4 illustrates a high-level flow diagram of a process using the throttle wherein Token Bucket is the basic throttle according to an embodiment of the present invention.

FIG. 4 illustrates a high-level flow diagram of a process using the throttle extension with Token Bucket as the basic throttle, according to an embodiment of the present invention. The process begins at step 402 when an offer is placed to the basic throttle at time $t_n$. Next, the process moves to step 404, where the throttle identifies the priority and class of the offer. The process continues in step 406, where the throttle updates the incoming rate measurement regarding priority and class.

In step 408, the throttle decreases the priority of the current offer according to $r_i(t_n) < s_i c(t_n)$ and in step 410 provisionally updates the Token Bucket size as if the offer had been admitted. $\beta(t_n)$ is calculated and if $\beta(t_n)$ is greater than or equal to the new watermark as shown in step 412, the process moves to step 414 and the bucket size is updated according to $b(t_n) = \beta(t_n)$.

On the other hand if $\beta(t_n)$ is less than the new watermark, as shown in step 416, the process moves to step 418 and the bucket size is updated with $b(t_n) = b(t_{n-1})$.

A simple estimator is disclosed to measure the rate of the offered and the admitted traffic because if an external load control mechanism provides such information then it is more effective to make decisions as the external load control mechanism.

Possible definitions, i.e., measures of the intensity or rate of a non stationary point process, follow. Let $N(t,t-T)$ be the counting process that is k whenever in the time interval $[t-T,t)$ there was k offers or admitted offers depending on what is to be measured. Suppose that each admitted offer arrives to the throttle every $t_n$ times. Example definitions:

1) Simple average with fixed measure points:

$$r(t_n) = N(T_i, T_i - T)/T$$

The number of offers is counted in T interval but always started from specified $T_i - T$, thus the update of $r(t)$ is independent of the arrivals, is predefined and the value is taken as constant for periods of T.

2) Sliding average on T interval:

$$r(t_n) = N(t_n, t_n - T)/T.$$

The number of offers is counted in T interval and then divided by T. The value of $r(t)$ is constant in $[t_{n-1}, t_n)$.

3) Sliding average on $T(t)$ interval:

$$r(t_n) = N(t_n, t_n - T(t))/T(t).$$

This needs to maintain the history of the process for $T(t)$ for a period of time, but can cause trouble if $T(t)$ is not bounded or too big, which is often the case. (If $T(t)$ is a stopping time, e.g., "the time elapsed from the last N event", that requests to maintain at least N timers, then it is bounded.)

4) Recursive sliding average:

$$r(t_n) = \min\{\chi(t_n)/T(t_n), (T(t_{n-1})r(t_{n-1}) - (t_n - t_{n-1})r(t_{n-1}) + \chi(t_n))/T(t_n)\} \chi(t_n) \text{ can be 1 or 0.}$$

This maintains only the previous $r(t_{n-1})$ and $T(t_{n-1})$ but often $T(t_{n-1}) := T(t_n) = W/c(t_n)$ is good. The variable t=time, W is the highest Watermark level in the Token Bucket and the times $t_n$, and $t_{n-1}$ stands for the times the current and previous offer has arrived respectively. $\chi(t_n)$ equals 1 if an offer arrived at $t_n$ if zero and if no offer. If $\chi(t_n)$ is allowed to take higher values it can handle marked Poisson processes, e.g., those scenarios when offers, for example consume a different number of tokens in the bucket upon admission (the estimation is only to measure the rate and may be independent from the bucket mechanism).

All the above definitions are asymptotically unbiased in limit of their parameter but with different efficiency. The first and the second (using the simplest definition) are easy to understand, to implement and often are practical using the setting $T_i$=every "T=1" second (that is a counter is checked every second)

since the average number of offers is taken at every second. However, since the parameters are fixed they are unable to follow more frequent changes in traffic than T. The third has the same disadvantage but the number of events is fixed.

In this case the definition to be used is the fourth because it has the best statistical properties, is easy to compute and the system has to remember for one former event. It will be further specified and discussed how to choose $T(t_n)$ and $T(t_{n-1})$ according to the desired characteristics of the admitted traffic.

Traffic Measurement with the Token Bucket Bound

To use the fourth definition $T(t_n)$ and $T(t_{n-1})$ has to be specified. Once the desired admitted traffic has the shape bound by a Token Bucket, with parameters c(t) for rate and W for watermark, the best choice is $T(t_{n-1}) = T(tn) = W/c(t)$. A constructed throttle should limit the traffic in the same way.

The offer rate parameter—denoted by $r_i(t_n)$—is measured per traffic class. Any of the above parameters can be used but the recursive sliding window has the most beneficial statistical properties with a small complexity.

Provide Traffic Share SLA and Maximal Throughput

It is possible that the offer rate of a given class is under its minimum share. In this case the gap between the offer rate and the minimum share can be understood as free, unused or as remaining capacity in the system. Then the following requirement can be proposed as an extension of the original; if there is free capacity in the system after the Service Level Agreements are met, the capacity should be split between traffic that wants to use more capacity in proportion to the traffic offer rate.

One of the most important benefits of using the throttle extension disclosed in the present invention is that the invention can be configured in such a way that the precedence between the minimum share requirement and the priority handling become clear. This is not clear in the solutions based on the Rate Based Call Gapping.

Priority Handling with Watermark Settings

An alternate embodiment that provides a simple way to handle priorities with using only the Watermark settings and not manipulating the parameters of the traffic estimators. This embodiment is based on decreasing priority level of offers. An example follows that illustrates the type of simple setups that are possible.

Suppose original priority levels exist in the system for normal and emergency calls with assigned watermarks: $W_n < W_e$. Two more levels $W_{nr} < W_n$, $W_{er} < W_e$ are introduced for the reduced priority of normal and emergency calls from the given class 'i' respectively. Now it is clear that $W_{nr} < W_n W_e$ and $W_{er} < W_e$ but the relation of $W_{er}$ to $W_n$ and even $W_{nr}$ determines the behavior of the system and can be set by the user.

Let $W_{er} < W_{nr} < W_n < W_e$ then one class i offer at a higher rate than its agreed share, and emergency calls are have higher priority than normal calls (it is doubtful that any operator requires this setting but is still possible to be set). On the other hand, if $W_{nr} < W_{er} < W_n < W_e$, normal priority calls from classes with an offer rate below the agreed share have higher priority than emergency calls for classes sending over their agreed share.

Let $W_{nr} < W_n < W_{er} < W_e$. In this case emergency calls from any class are always higher priority than normal calls regardless of traffic shares. Note that the new priority levels can be understood as a new dimension for priority. If the parameter settings are clear the priority dimensions have clear precedence.

Figure 5:
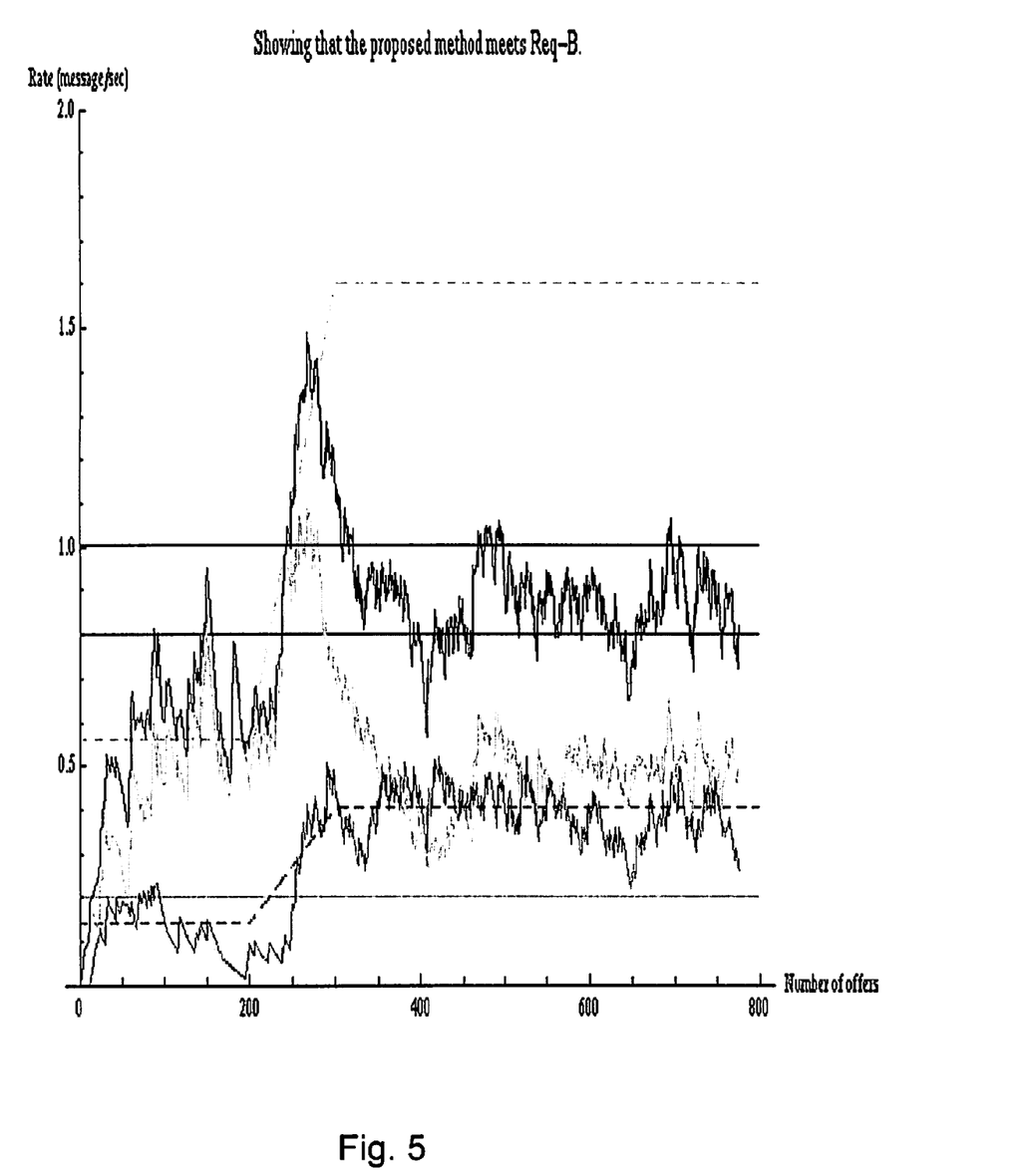
FIG. 5 is a graphical simulation of the present invention using an extended Token Bucket throttle.

It can be seen clearly that the admission rate of traffic Class B is similar to the offer rate of Class B, because its offer rate is always below its minimum share. All the rejected offers are from Class A since it offers more traffic than its minimum share. It is also clear that the throughput is maximized.

In the first period when there is no overload in the system all offers are admitted (the admission rate for both Class A and B are at their offer rates). A short peak period comes when the offer rates increase. This is because of the Token Bucket characteristics. Then at the overload part the aggregate throughput is similar to the Token Bucket maximal throughput i.e. the minimum share is provided for both Class B and class A while the rest of the capacity is utilized too.

Advantages of the Invention

The main advantage of the throttle extension is that different watermarks are applied for different priority levels thus, the throughput characteristics are different for priorities. The throttle extension can be attached to any call gapping, throttling, rate limiting mechanism and it keeps their characteristics while providing minimum share for traffic classes. An additional advantage is its simplicity and all that is required, basically, is to measure incoming offer rates. The present invention can be mixed and used together with other existing solutions. The mixture and usage influences how strict the priority handling of the system will be and how important is the fair sharing compared to priority handling.

Abbreviations

| | |
|---|---|
| CPU | Central Processing Unit |
| GPS | Generalize Processor Sharing |
| IMS | IP Multimedia Subsystem |
| NGN | Next generation network |
| TCP | Transmission Control Protocol |
| SCTP | Stream Control Transmission Protocol |
| SLA | Service Level Agreement |
| WFQ | Weighted Fair Queuing |

What is claimed:

1. A method of reducing traffic overload in a Next Generation Network (NGN), wherein traffic includes the flow of admitted requests, calls, packets and tasks, the method comprising steps of:
   utilizing a throttle device, coupled with a basic throttle having different levels of traffic priority, situated between a source node and a target node for processing a traffic offer received from the source node, the throttle device configured to cause a central processing unit to determine whether to send the traffic offer on to a node targeted by the source node;
   provisionally updating the basic throttle, by the throttle device, as if the traffic offer is admitted, wherein a new traffic priority level of the basic throttle is determined;
   admitting the traffic offer if a traffic priority level of the provisionally updated basic throttle is greater than or equal to the new traffic priority level; and
   rejecting the traffic offer if the provisionally updated basic throttle traffic priority level is less than the new traffic priority level.

2. The method of claim 1, wherein the basic throttle is a Token Bucket, the traffic priority level is a watermark level and the Token Bucket having different watermark levels corresponding to different traffic priorities.

3. The method of claim 1, wherein determining whether to send the traffic offer to a target node further comprises;
   determining a traffic offer rate;
   determining a class and priority of the received traffic offer; and
   updating the traffic offer class and the priority of the received traffic offer.

4. The method of claim 3, further comprising adjusting the priority of the traffic offer according to a predetermined threshold, wherein if the offer rate is higher than the predetermined threshold the priority of the traffic offer is decreased and if the offer rate is the same or lower there is no priority adjustment.

5. The method of claim 4, wherein the capacity of the basic throttle is left unchanged if the traffic offer is rejected and updated if the traffic offer is admitted.

6. The method of claim 4, wherein the relationship $$r(t_n) = \min\{\chi(t_n)/T(t_n), (T(t_{n-1})r(t_{n-1})-(t_n-t_{n-1})r(t_{n-1})+\chi(t_n))/T(t_n)\}$$

measures the rate of offered and admitted traffic, wherein
   $r(t_n)$ is offer rate;
   $\chi$ is an integer;
   T is interval; and
   times $t_n$, and $t_{n-1}$ stand for the times that the current and previous offer has arrived, respectively.

7. A throttle device, coupled with a central processing unit in a node for reducing traffic overload in a Next Generation Network (NGN), wherein traffic includes the flow of admitted requests, calls, packets and tasks, the throttle device comprising:
   the throttle device, coupled with a basic throttle having different levels of traffic priority, being situated between a source node and a target node for processing a traffic offer received from the source node, the throttle device configured for determining whether to send the traffic offer on to a node targeted by the source node;
   the throttle device provisionally updating the basic throttle as if the traffic offer is admitted, wherein a new traffic priority level of the basic throttle is determined;
   the basic throttle
   admitting the traffic offer if a traffic priority level of the provisionally updated basic throttle is greater than or equal to the new traffic priority level; and
   rejecting the traffic offer if the provisionally updated basic throttle traffic priority level is less than the new traffic priority level.

8. The throttle device of claim 7, wherein the basic throttle is a Token Bucket, the traffic priority level is a watermark level and the Token Bucket having different watermark levels corresponding to different traffic priorities.

9. The throttle device of claim 7, wherein the throttle device, when determining whether to send the traffic offer to a target node, is further configured for:
   determining a traffic offer rate;
   determining a class and priority of the received traffic offer; and
   updating the traffic offer class and the priority of the received traffic offer.

10. The throttle device of claim 9, further configured for adjusting the priority of the traffic offer according to a predetermined threshold, wherein if the offer rate is higher than the predetermined threshold the priority of the traffic offer is decreased and if the offer rate is the same or lower there is no priority adjustment.

11. The throttle device of claim 10, wherein the capacity of the basic throttle is left unchanged if the traffic offer is rejected and updated if the traffic offer is admitted.

12. The throttle device of claim 11, wherein the relationship $$r(t_n) = \min\{\chi(t_n)/T(t_n), (T(t_{n-1})r(t_{n-1}) - (t_n - t_{n-1})r(t_{n-1}) + \chi(t_n))/T(t_n)\}$$

measures the rate of offered and admitted traffic, wherein
   $r(t_n)$ is offer rate;
   $\chi$ is an integer;
   T is interval; and
   times $t_n$, and $t_{n-1}$ stand for the times that the current and previous offer has arrived, respectively.

13. A system in a Next Generation Network (NGN) for reducing traffic overload, wherein traffic includes admitted requests, calls, packets and tasks, the system comprising:
   a throttle device coupled with a central processing unit, the throttle device, being coupled with a basic throttle having different levels of traffic priority, and being situated between a source node and a target node for processing a traffic offer received from the source node,
   the throttle device configured for:
      determining whether to send the traffic offer on to a node targeted by the source node;
      provisionally updating the basic throttle as if the traffic offer is admitted, wherein a new traffic priority level of the basic throttle is determined; and
   the basic throttle
      admitting the traffic offer if a traffic priority level of the provisionally updated basic throttle is greater than or equal to the new traffic priority level; and
      rejecting the traffic offer if the provisionally updated basic throttle traffic priority level is less than the new traffic priority level.

14. The system of claim 13, wherein the basic throttle is a Token Bucket, the traffic priority level is a watermark level and the Token Bucket having different watermark levels corresponding to different traffic priorities.

15. The system of claim 13, wherein the throttle device, when determining whether to send the traffic offer to a target node, is further configured for:
   determining a traffic offer rate;
   determining a class and priority of the received traffic offer; and
   updating the traffic offer class and the priority of the received traffic offer.

16. The system of claim 15, wherein the throttle device is further configured for adjusting the priority of the traffic offer according to a predetermined threshold, wherein if the offer rate is higher than the predetermined threshold the priority of the traffic offer is decreased and if the offer rate is the same or lower there is no priority adjustment.

17. The system of claim 13, wherein the capacity of the basic throttle is left unchanged if the traffic offer is rejected and updated if the traffic offer is admitted.

18. The system of claim 17, wherein the relationship $$r(t_n) = \min\{\chi(t_n)/T(t_n), (T(t_{n-1})r(t_{n-1}) - (t_n - t_{n-1})r(t_{n-1}) + \chi(t_n))/T(t_n)\}$$

measures the rate of offered and admitted traffic, wherein
   $r(t_n)$ is offer rate;
   $\chi$ is an integer;
   T is interval; and
   times $t_n$, and $t_{n-1}$ stand for the times that the current and previous offer has arrived, respectively.

* * * * *

UNITED STATES PATENT AND TRADEMARK OFFICE
CERTIFICATE OF CORRECTION

PATENT NO. : 8,000,237 B1
APPLICATION NO. : 12/695734
DATED : August 16, 2011
INVENTOR(S) : Kenesi et al.

Page 1 of 1

It is certified that error appears in the above-identified patent and that said Letters Patent is hereby corrected as shown below:

Title Page, below "(22) Filed", in Column 1,
insert Field -- (65) Prior Publication Data, US 2011/0182176 A1 Jul. 28, 2011 --.

Title Page, in Field (56), under "OTHER PUBLICATIONS", in Column 2, Line 7, delete "Tetecommunications" and insert -- Telecommunications --, therefor.

In Column 6, Lines 25-27, delete "since.............fixed", and insert the same at Line 24, after "second)" as a continuation paragraph.

In Column 6, Line 39, delete "$T(t_{n-1)=T(tn)}=W/c(t).$" and insert -- $T(t_{n-1})=T(t_n)=W/c(t).$ --, therefor.

In Column 7, Line 6, delete "$W_{nr}<W_nW_e$" and insert -- $W_{nr}<W_n<W_e$ --, therefor.

In Column 8, Line 20, in Claim 3, delete "comprises;" and insert -- comprises: --, therefor.

Signed and Sealed this
Twentieth Day of March, 2012

David J. Kappos
*Director of the United States Patent and Trademark Office*